United States Patent [19]

Perlman et al.

[11] Patent Number: 5,053,631

[45] Date of Patent: Oct. 1, 1991

[54] PIPELINED FLOATING POINT PROCESSING UNIT

[75] Inventors: Robert M. Perlman, San Jose; Prem Sobel, Sunnyvale, both of Calif.; Brian D. McMinn, Austin, Tex.; Robert C. Thaden, Austin, Tex.; Glenn A. Tamura, Austin, Tex.; Thomas W. Lynch, Austin, Tex.; Raju Vesgesna, Austin, Tex.

[73] Assignee: Advanced Micro Devices, Inc., Sunnyvale, Calif.

[21] Appl. No.: 503,817

[22] Filed: Apr. 2, 1990

[51] Int. Cl.5 .............................................. G06F 7/38
[52] U.S. Cl. ..................................... 364/748; 364/736
[58] Field of Search ................................. 364/748, 736

[56] References Cited

U.S. PATENT DOCUMENTS

| | | | |
|---|---|---|---|
| 4,075,704 | 2/1978 | O'Leary | 364/748 |
| 4,589,067 | 5/1986 | Porter et al. | 364/748 X |
| 4,683,547 | 7/1987 | DeGroot | 364/748 |
| 4,766,564 | 8/1988 | DeGroot | 364/748 |

Primary Examiner—Dale M. Shaw
Assistant Examiner—Tan V. Mai
Attorney, Agent, or Firm—Johnson & Gibbs

[57] ABSTRACT

A floating point processor for pipelining a series of calculations of simple and compound arithmetic operations includes at least one arithmetic operation unit for performing arithmetic operations on input operands provided to the arithmetic operation units and at least one accumulator for storing the results of the arithmetic operations performed by the arithmetic operation unit. The results stored in the accumulators are then provided to the arithmetic operation units. Arithmetic operations are pipelined through the floating point processor by a series of latches which sequence the input operands, results produced by the arithmetic operation units using the input operands, and results produced by the arithmetic operation units using the input operands and the accumulated operands.

34 Claims, 1 Drawing Sheet

PIPELINED FLOATING POINT PROCESSING UNIT

CROSS REFERENCE TO RELATED APPLICATIONS

This application is related to the following U.S. Patent Applications:

| SERIAL NO. | TITLE | INVENTOR |
|---|---|---|
| 07/503,819 | Normalizing Pipelined Floating Point Processing Unit | Gupta, et al. |
| 07/504,127 | Arithmetic Unit Having Multiple Accumulators | Tamura, et al. |
| 07/505,351 | Apparatus and Method For Collecting Boolean Conditions of Multiple Operations | McMinn, et al. |
| 07/505,350 | A Special Carry Save Adder For High Speed Iterative Division | Shah, et al. |
| 07/503,818 | High Speed Mixed Radix Adder | Lynch, et al. |
| 07/503,822 | Radix 4 Carry Lookahead Tree and Redundant Cell Therefor | Lynch, et al. |
| 07/504,324 | High Speed Divider With Square Root Option | Lynch, et al. |

All cross references are filed on even date herewith, assigned to the assignee of the present invention and hereby incorporated by reference as if reproduced in their entirety.

BACKGROUND OF THE INVENTION

1. Field of the Invention

The invention relates to a floating point processing unit and, more particularly, to a floating point processing unit which includes means for sequencing operands and results of simple and compound arithmetic operations to pipeline arithmetic operations performed by the floating point processing unit.

2. Description of Related Art

As is known in the art, a floating point number is comprised of an exponent portion and a mantissa portion. The exponent portion represents a power to which a base number such as 2 is raised and the mantissa portion is a number to be multiplied by the base. Accordingly, the actual number represented by a floating point number is the mantissa portion multiplied by the base number raised to a power specified by the exponent portion. In such a manner, any particular number may be approximated in floating point notation as $f \times B^e$ or $(f,e)$ where f is an n digit signed mantissa, e is an m digit signed integer exponent and B is the base number system used. For example, in many computer systems, the base number system used is the binary number system where $B=2$. Other computer systems use the decimal number system $(B=10)$ or the hexadecimal number system $(B=16)$ as their base number system.

Most floating point numbers may be characterized as either a normalized floating point number or a denormalized floating point number. A normalization scheme for floating point numbers assures that all floating point numbers with the same value have the same representation. One normalization scheme is to ensure that the position of the most significant bit of the mantissa is one. Accordingly, to normalize a floating point number, the binary point is shifted to the right until the left most digit in the mantissa has a value of one. The exponent is then decreased so that the value of the combination of the mantissa and the exponent remains constant. This procedure is often called "wrapping" because the exponent is often decreased until it "wraps" around zero and becomes negative.

Conversely, a floating point number which is not normalized is denormalized. Thus, in accordance with the normalization scheme set forth above, a floating point number whose leading significand bit is zero is a denormalized floating point number. To denormalize a normalized floating point number, the reverse procedure may be followed. Thus, a typical denormalization process is shifting the decimal point of the denormalized number to the left the desired amount and then increasing the exponent until the value of the combination of the mantissa and the exponent is the same.

Floating point numbers may be added, subtracted, multiplied, or divided. Floating point addition can only be performed, however, when the exponents of both input operands are the same. Hence, those operands input an add unit for addition or subtraction which have different exponents must be adjusted to make the exponents coincide. Adjustments to the exponents must be accompanied by shifts in the mantissa in order to keep the values of the operands the same. Typically, the necessary adjustment is made by denormalizing the smaller number. The sum or difference between two input operands may be a denormalized number, so that the add unit is typically associated with a renormalizer for normalizing results.

In a practical computer, however, arithmetic operations are often complicated by the fact that the mantissa portion of a number is not of infinite "precision", i.e. there are not an unlimited number of digits which may be assigned to the mantissa portion of a floating point number. Instead, floating point numbers are normally processed in a register comprising a fixed number of digits. Thus, although two input operands to be added together or subtracted from each other may be exact numbers, the sum or difference after completing the addition or subtraction operation may create more significant digits than the fixed number of digits in the register. As a result, an accurate representation of the sum or difference must be squeezed into the fixed number of digits in the register by the processes of normalizing and rounding.

The limitation that floating point numbers are never of infinite precision makes it very important that the input operands used in floating point multiplication or floating point division are normalized before performing the arithmetic operation. For example, if two floating points numbers, each having an eight bit mantissa, are multiplied together, the result will be a floating point number having a sixteen bit answer. Despite this increase in mantissa size, the number of bits in the output mantissa must be the same as the number of bits in the input mantissas. Thus, to form an output, half of the bits of the answer must be thrown away, typically by deleting the right most bits of the mantissa. If the input operands are not normalized, the answer will not be left justified and bits containing an important part of the answer will not be thrown away. If, on the other hand, the input operands are normalized, the answer will be left justified and as little information as possible will be thrown away when producing the output.

Two other problems arise when arithmetic operations are performed using a floating point processing unit. These are the conditions generally referred to as arithmetic "underflow" and arithmetic "overflow". There are two ranges of numbers that correspond to arithmetic overflow and arithmetic underflow, respectively. If the result of an arithmetic operation is greater than the largest positive or less than the least negative value representable, arithmetic overflow occurs. On the other hand, when the result of arithmetic operation is too small to be expressed, either positive or negative arithmetic underflow has occurred.

Overflow occurs whenever the destination formats largest finite number is exceeded in magnitude by what would have been the rounded floating point result. For example, in a floating point multiplication operation where the mantissas are multiplied and the exponents added, if the sum of the exponents exceeds the maximum representable exponent, an overflow has occurred. On the other hand, in a floating point division operation, if the divisor is sufficiently smaller than the dividend, the quotient may exceed the maximum number representable. This too, would be an overflow condition.

Conversely, two correlated events contribute to underflow. One event is the creation of a tiny, non-zero result which cannot be represented as a normalized number. Because it is so small, this number may cause some other exception later such as overflow upon division. The other event is extraordinary loss of accuracy during the approximation of such tiny numbers by denormalized numbers. While underflow and/or overflow conditions may occasionally be produced during addition or subtraction operations, they are most common during floating point multiplication or division operations.

To obtain the fastest possible computational throughput, digital computer architecture often employs pipeline processing techniques. The data to be processed is streamed through the pipeline, thereby obtaining faster processing by a factor that depends upon the number of pipeline stages utilized. Pipelined floating point processor units having multiple arithmetic operation units have been disclosed in the art. For example, U.S. Pat. No. 4,683,547 to DeGroot discloses a data processing system having a multiple floating point arithmetic unit with a putaway at a bypass bus. In the DeGroot apparatus, the results of each multiply/divide operation are passed on to a bypass bus to the input of an adder along with the inputs from the cumulate bypass bus which is the output from the adder for an automatic add operation on an accumulate multiply or accumulate divide operation. This configuration allows two floating point results be produced each cycle.

U.S. Pat. No. 4,075,704 to O'Leary discloses a floating point data processor comprising a floating point adder, a floating point multiplier and a plurality of memory register means. The floating adder individually drives a first bus for supplying selectable inputs to memory register means, the adder and the multiplier while the floating multiplier individually drives a second bus for also supplying selectable inputs to memory register means, the adder and the multiplier. The adder and the multiplier are provided with individual destination, input busses for receiving selectable outputs from memory register means. The floating adder and the floating multiplier are pipelined circuits each including a plurality of stages with intermediate temporary storage means for catching partial results computed during one clock period for presentation to the next stage during the next clock period.

U.S. Pat. No. 4,766,564, also to DeGroot, is directed to a data processing system which includes multiple floating point arithmetic units such as an adder and a multiplier, two putaway busses and two bypass busses connected to a register file and waiting stages associated with the arithmetic units, respectively. A special source register is included for keeping track of the source of any result in the busses so that the registers may be connected to the appropriate bus on which the result is to appear in the course of a busy or mark bit set in each register in the file and in the waiting stage. As a result, multiple data items to exit the pipes during any cycle is permitted.

It is an object of this invention to provide a floating point processor which provides for the pipelining of arithmetic operations performed by the processor.

It is another object of this invention to provide a floating point processor which provides for the pipelining of simple and compound arithmetic operations through floating point arithmetic operation units associated with the floating point processor.

It is yet another object of this invention to provide a floating point processor which includes at least one floating point arithmetic operation unit, means for pipelining input operands supplied to each arithmetic operation unit and means for pipelining results produced by each arithmetic operation unit.

It is still yet another object of this invention to provide a floating point processor which includes a plurality of floating point arithmetic operation units sharing common normalizing, denormalizing and rounding units.

SUMMARY OF THE INVENTION

In one aspect, the present invention is of a pipelining floating point processor which includes at least one arithmetic operation unit for performing arithmetic operations on input operands provided to the arithmetic operation units. The results of arithmetic operations performed by the arithmetic operation unit are stored in at least one accumulator. The floating point processor further includes means for providing the results stored in the accumulators to the arithmetic operation units as accumulated operands. Arithmetic operations, including compound arithmetic operations which are performed using the accumulated operands, are pipelined through the floating point processor by staging means which sequences the input operands, results produced by the arithmetic operation units using the input operands, and results produced by the arithmetic operation units using the input operands and the accumulated operands. In further embodiments of this aspect of the invention, the staging means includes means for temporarily delaying input operands to be provided to the arithmetic operation units for compound arithmetic operations with the accumulated operands are produced. In yet another embodiment, the staging means further includes means for latching intermediate results produced by the arithmetic operation units.

In another aspect, the present invention is a floating point processor for performing arithmetic operations which comprises a first and second arithmetic operation units, each having a pair of inputs for receiving input operands and an output for transmitting results of the arithmetic operations performed by the arithmetic operation units, a denormalizer for denormalizing normalized input operands, a renormalizer for normalizing denormalized results produced by the second arithmetic unit, a common rounder unit having an input connected to the outputs of the first and second arithmetic operation unit and the renormalizer and means for pipelining the input operands and the produced results through the floating point processor. The floating point processor further includes at least one accumulator for storing the results of arithmetic operations performed by the first and second arithmetic operation units and means for providing said accumulator output to the first and second arithmetic operation units for compound arithmetic operations. In further embodiments of this aspect of the invention, the means for pipelining input operands and results through the floating point processor further comprises a series of intermediate result latches for latching the outputs of the first and second operation unit output, the renormalizer and the denormalizer. In still further embodiments of this aspect of the invention, additional latches are provided for latching a first one of a pair of input operands to one of the arithmetic operation units when the other input operand to that arithmetic operation unit is provided by the accumulator.

BRIEF DESCRIPTION OF THE DRAWINGS

The present invention may be better understood, and its numerous objects, features and advantages become apparent to those skilled in the art by referencing the accompanying drawings in which.

DETAILED DESCRIPTION OF THE INVENTION

Figures 1A, 1B, 2:
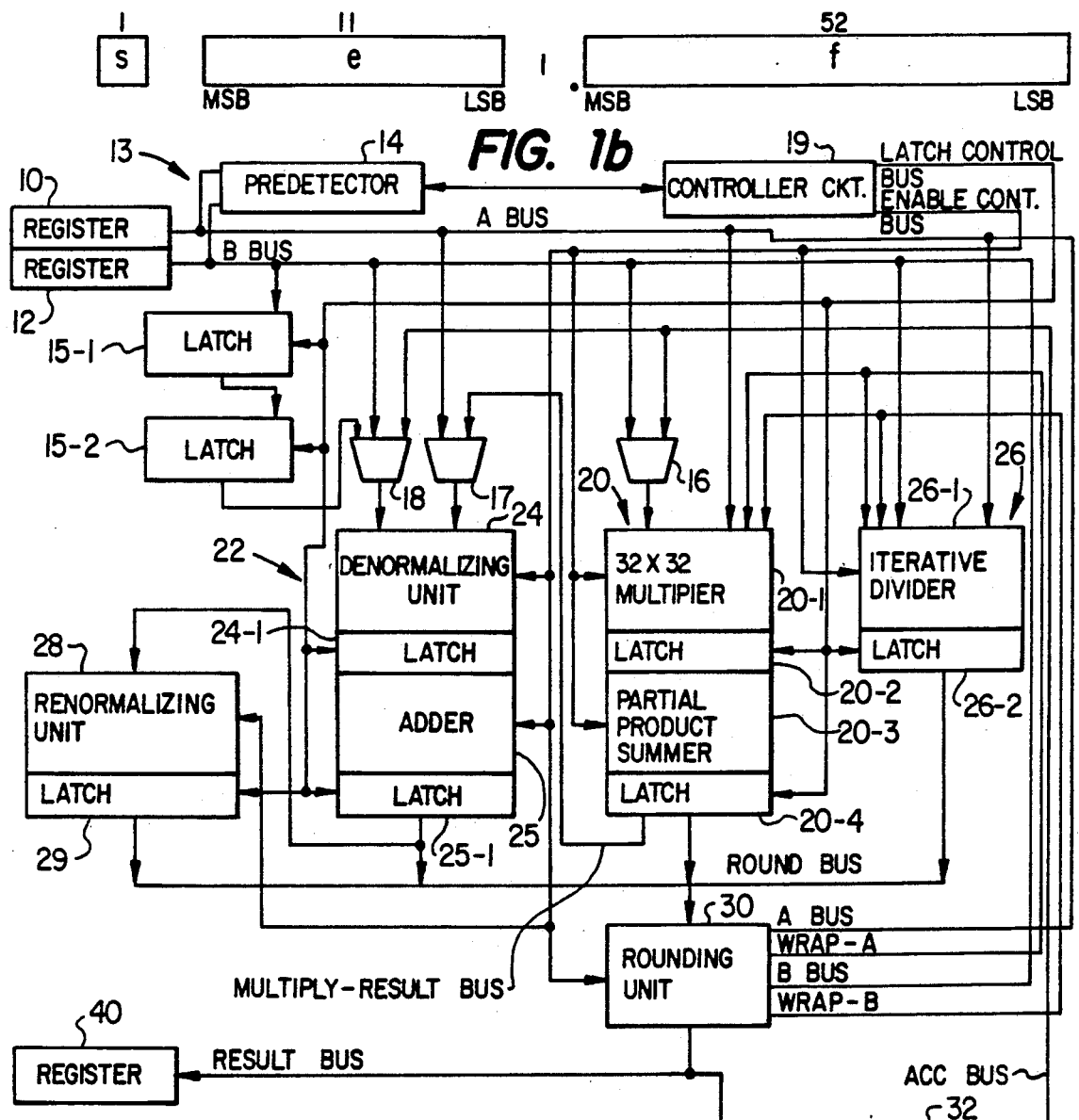
FIG. 1a illustrates the format of a single precision number for processing by a floating point processing unit.
FIG. 1b illustrates the format of a double precision floating point number which may be processed by the floating point processing unit of the present invention.
FIG. 2 is a block diagram of a floating point processing system constructed in accordance with the teachings of the present invention.

Referring first to FIG. 1a, the format of a 32 bit single precision floating point number shall now be described. The format of the 32 bit single precision number is divided into a one bit sign field "s" which is one for a negative mantissa and zero for a positive mantissa, an eight bit exponent field "e" which is ordered from most significant bit (or "msb") to least significant bit (or "lsb") going from left to right, a so called "hidden" bit which, although not explicitly expressed, is assumed to be "1", and a 23 bit fraction field "f", again ordered from msb to lsb going from left to right. Between the hidden bit and the fraction is an implied decimal point which is reproduced in the drawing for illustrative purposes only. Together, the hidden bit and the fraction field make up the mantissa of a single precision floating point number and, together with the exponent field, make up the floating point number itself.

Referring next to FIG. 1b, the format of a 64 bit double precision floating point number shall now be described. Unlike the single precision floating point number which is capable of operating on a 32 bit bus, the double precision floating point number requires a 64 bit bus. The exponent field of the double precision floating point number is increased to 11 bits and the field portion of the mantissa is increased to 52 bits.

Referring next to FIG. 2, a pipelined floating point processing unit constructed in accordance with the teachings of the present invention may now be seen. A pair of 32 bit registers 10, 12 are provided for storing floating point numbers formatted in accordance with the single precision format. For floating point numbers formatted in accordance with double precision format, two 32 bit wide registers 10 and two 32 bit wide registers 12 are required to store each floating point number. For ease of description of the arithmetic operations to be performed on the numbers, formatted numbers stored in the register 10 shall hereafter be referred to as "operand A" and formatted numbers stored in the register 12 shall hereafter be referred to as "operand B". The contents of the register 10, i.e. the operand A, is input to a floating point arithmetic processing unit 13 along an A bus. Similarly, the contents of the register file 12, i.e. the operand B, is input to the floating point arithmetic processing unit 13 along a B bus. Preferably, the A bus and the B bus should both be 64 bits wide so that arithmetic operations utilizing either a pair of single precision floating point numbers or a pair of double precision floating point numbers may be performed by the floating point processing unit 13.

The floating point arithmetic processing unit 13, which typically includes a plurality of arithmetic operation units for performing a plurality of arithmetic operations on input operands, performs a selected simple arithmetic operation upon input operands A-1 and B-1 and outputs a result C-1 produced by the selected arithmetic operation to a RESULT bus where the result C-1 may be transferred to a register 40 for storage. Similar to the registers 10, 12, the register 40 is either a single 32 bit wide register for storing single precision numbers or two 32 bit wide registers for storing double precision numbers. Also, in alternative embodiments of the invention, the registers 10, 12 and 40 may either be in separate register files, different memory units within a single register file, or the same memory unit within a single register file. The floating point arithmetic processing unit further includes accumulators 32, 34, 36, 38 so that the arithmetic operation units may also perform compound arithmetic operations. For compound arithmetic operations, the result C-1 is stored in one of the accumulators 32, 34, 36, 38. The multiple accumulators are described in greater detail in co-pending patent application Ser. No. 07/504,127, entitled "Arithmetic Unit Having Multiple Accumulators" to Sobel et al., filed on even data herewith and previously incorporated by reference. The result C-1 and a next input operand, for example B-2, are then provided to the arithmetic operation units by the accumulators 32, 34, 36, 38 and the B bus, respectively, to produce a next result C-2. The next result C-2 may then be output to the register 40 via the RESULT bus or may be stored in the accumulators 32, 34, 36, 38 for yet another compound arithmetic operation. It is contemplated that the floating point processor may be configured to perform various compound arithmetic operations including a multiply-accumulate compound arithmetic operation:

$$C\text{-}2 = (\text{OPERAND A} * \text{OPERAND B}) + C1 \quad (1)$$

and a multiply-sum operation:

$$C\text{-}2 = (\text{OPERAND A} * C\text{-}1) + \text{OPERAND B} \quad (2)$$

The floating point processing unit 13 includes at least one arithmetic operation unit for performing floating point arithmetic operations. In the embodiment disclosed herein, the floating point processing unit 13 includes a multiply unit 20 for performing floating point multiplication operations, an add unit 22 for performing plural floating point arithmetic operations as to be more fully described later, and a divide unit 26 for performing floating point division operations. The divide unit may be configured to perform both division and square root operations such as the divider described in copending patent application Ser. No. 07/504,324 entitled "High Speed Divider With Square Root Option" to Lynch, et al., filed on even date herewith and previously incorporated by reference. Each of the multiply unit 20, the add unit 22 and the divide unit 26 has first and second inputs for receiving first and second input operands and an output for transmitting the product of the input operands. The floating point processing unit 13 also includes a renormalizing unit 28 for normalizing denormalized numbers, a common rounding unit 30 to be more fully described below, input operand latches 15-1, 15-2 and a plurality of result latches 20-2, 20-4, 24-1, 25-1, 26-2 and 29. The input operand latches 15-1, 15-2 and the result latches 20-2, 20-4, 24-1, 25-1, 26-2 and 29 provide for the pipelining of simple and compound arithmetic operations through the floating point processor 13. More specifically, the input operand latches 15-1, 15-2 support compound arithmetic operations by delaying input operands. For example, if the compound arithmetic operation C-2=OPERAND B+(C-1 * OPERAND A) was desired, the input latches 15-1, 15-2 would delay the input of operand B to the second input of the add unit 22 while operand A and accumulated result C-1 are input to the multiply unit 20, the product of A and C-1 is determined and the result (A * C-1) is provided to the first input of the add unit 22. On the other hand, in order to pipeline a series of arithmetic operations through the floating point processor 13, the result latches 20-2, 20-4, 24-1, 25-1, 26-2 and 29 provide for the latching of intermediate results produced by the floating point processor 13. In such a manner, successive pairs of input operands may be provided to the floating point processor 13 for the performance of a selected arithmetic operation before the result of a previously selected arithmetic operation produced using a prior pair of input operands is determined. By latching the output of an intermediate result produced using first and second input operand, a successive pair of first and second input operands may then be input to the floating point arithmetic unit which produced the intermediate result as soon as the prior intermediate result is latched.

More specifically, the first input of the multiply unit 20 is connected to the A bus for receiving the operand A from the register 10, and the second input of the multiply unit 20 is connected to a two input multiplexer 16 such that the operand provided to the second input of the multiply unit 20 may be selectively provided from the B bus or from an ACC bus to be more fully described below. Likewise, the first input of the divide unit 26 is connected to the A bus for receiving the operand A from the register file 10 and the second input is connected to the B bus for receiving the operand B from the register file 12.

Finally, the add unit 22, which is a multiple function unit configured to perform addition and subtraction, and, if desired, comparisons, conversions, wrapping, unwrapping and other functions. Included as part of the add unit 22 is a denormalizing unit 24, for example, a right shift barrel shifter, for denormalizing normalized numbers. The first input of the add unit 22 is connected to a two way multiplexer 17 for selectively providing either operand A from the A bus or the output from the multiply unit 20 as the first input to the add unit 22. The second input of the add unit 22 is connected to a three way multiplexer 18 for selectively providing either operand B directly from the B bus, operand B via first and second input operand latches 15-1, 15-2, or the output from the ACC bus. Connected to the output of the add unit 22 is a renormalizing unit 28, for example a left shift barrel shifter, for normalizing denormalized numbers if the exponents differ by more than one. The renormalizer may have an input connected to the output of the add unit 22 as is illustrated in FIG. 2 or may be incorporated as part of the add unit 22 itself. The output of the add unit 22 is further connected to the input of the rounding unit 30 via a ROUND bus to permit the selective propagation of the output of the add unit 22 to either the renormalizing unit 28 or the rounding unit 30.

When the performance of a multiplication or division operation using the operands A and B is desired, the operands A and B are supplied along the A bus and the B bus, respectively, to the inputs of the multiply unit 20 if a multiplication operation is selected, or the inputs of the divide unit 26 if a division operation is selected, and the inputs of the add unit at the same time. While the operands A and B arrive at the inputs of the multiply unit 20 or the divide unit 26 and the add unit 22 at the same time, the propagation of the operands A and B through these arithmetic operation units is controlled by a controller circuit 19. The controller circuit 19 supplies control signals to the multiply unit 20, the add unit 22, the divide unit 26, the renormalizing unit 28 and the common rounding unit 30 to indicate whether the designated unit should propagate the operand provided to its inputs through the unit without performing the arithmetic operation of the particular arithmetic unit on the operand or operands propagating therethrough, perform the arithmetic operation of the particular arithmetic unit on the operand or operands propagating therethrough or perform operations other than the arithmetic operation of the particular arithmetic unit on the operand or operands propagating therethrough. The signals from the controller circuit 19 to the multiply unit 20, the add unit 22, the denormalizing unit 24, the divide unit 26, the renormalizing unit 28 and the rounding unit 30 are transmitted from the controller circuit 19 along the control bus to the respective arithmetic operation unit.

In addition, the controller circuit is also configured to hold or "stall" operands or results at either the input or the output of an arithmetic unit. By providing a series of latches associated with the floating point processing unit 13, the input operands and results may be sequentially propagated through the floating point processing unit 13 in a series of "stages". Without the staging of operands and/or results, arithmetic operation units associated with the floating point processor 13 would be unable to receive a next pair of input operands until the final result produced using a prior pair of input operands is output, thereby resulting in a very low issue rate. Staging, on the other hand, permits the next pair of input operands to be transmitted to an arithmetic operation unit before the final result is produced. In the embodiment disclosed herein, it is contemplated that an intermediate result latch is associated with each arithmetic unit of the floating point processor unit 13. Accordingly, the result produced by the multiply unit 20 is latched by the intermediate result latch 20-4, the result produced by the denormalizing unit 24 is latched by the intermediate result latch 24-1, the result produced by the add unit 25 is latched by the intermediate result latch 25-1, the result produced by the divider 26 is latched by the intermediate result latch 26-2 and the result produced by the renormalizing unit 28 is latched by the intermediate result latch 29.

In a further embodiment disclosed herein, it is further contemplated that the multiply unit is comprised of a 32 by 32 multiplier element 20-1 for either multiplying two single precision input operands, multiplying two double precision input operands, or performing 32 by 32 bit integer multiplication, to produce a plurality of sums and carries. To produce the plurality of sums and carries during 32 by 32 bit integer multiplication or multiplication of two single precision numbers, a single pass through the 32 by 32 multiplier element 20-1 is required. For the multiplication of two double precision numbers, four passes through the 32 by 32 multiplier element 20-1 are required. The plurality of sums and carries are then input to a partial product summing element 20-3 to add the sums and carries together to produce the product of the input operands. It is further contemplated that the result produced by the 32 by 32 multiplier element 20-1 is latched by the intermediate result latch 20-2 and the result produced by the partial product summer element 20-3 is latched by the intermediate result latch 20-4. Each intermediate result latch 20-2, 20-4, 24-1, 25-1, 26-1 and 29 is controlled by the controller circuit 19 via the latch control bus by the generation of latch and unlatch signals which permit the pipelinning of operands and results through the floating point processor 13 by latching each intermediate result produced by an arithmetic operation unit and propagating a next input operand into the arithmetic operation unit once the prior intermediate result is latched. The generation of latch and unlatch control signals by the controller circuit 19 is also described in greater detail in U.S. patent application Ser. No. 07/504,127, entitled "Arithmetic Unit Having Multiple Accumulators" to Sobel et al., filed on even date herewith and previously incorporated by reference.

In such a manner, the controller circuit 19 controls the selection of arithmetic operation units to perform selected arithmetic operations, the input of operands to the selected arithmetic operation units, the order in which the selected arithmetic operations are conducted, the pipelining of plural operands through the floating point processing unit 13 for plural arithmetic operations, the storage of results in the accumulators and the input of accumulated results to arithmetic operation units for compound arithmetic operations.

Operands A and B are further input along the A bus and the B input bus, respectively, to a predetector circuit 14 where analysis and partial arithmetic operations are performed utilizing the operands A and B. The predetector circuit 14 provides the results of the analysis and partial arithmetic operations to the controller circuit 19. Based on the analysis of the input operands by the predetector circuit 14, the controller circuit 19 will generate a series of control signals to the multiply unit 20, the add unit 22, the divide unit 26, the renormalizing unit 28 and the rounding unit 30 for controlling the processing the operands A and B. Typically, the generation of control signals by the controller circuit 19 to the floating point processor 14 will be partially based upon the type and number of arithmetic operations to be performed by the floating point processor 14 and at least partially based upon the analysis of the operands A and B performed by the predetector circuit 14.

The floating point processing unit 13 includes means for determining whether the input operands A and B presented to the inputs of either the multiply unit 20 or 26 and the add unit 22 are denormalized. While such means may be provided anywhere along the A and B buses, the disclosed embodiment of the invention contemplates including such means as part of the predetector circuit 14. Accordingly, the predetector circuit 14 will first analyze the operands A and B to determine whether the input operands A and B are denormalized in accordance with ANSI IEEE Standard 754-1985 by examining the exponent portion of the input operands A and B. Depending on the particular numbers input as input operands A and B, either both input operands, one of the input operands or neither of the input operands will be determined to be denormalized. Next, based on the respective determinations of the normality of input operands A and B, the controller circuit 19 will modify the routing of the input operands A and B through the floating point processing unit 13. See, for example, U.S. patent application Ser. No. 07/503,819 entitled "Normalizing Pipelined Floating Point Unit" to Gupta et al., filed on even date herewith and previously incorporated by reference. Typically, numbers are input to the floating point processor 13 along the A bus and the B bus where they utilized as operands in a desired operation. The controller circuit 19 controls the arithmetic operation performed on the input operands by a series of connections between the controller circuit 19 to the multiply unit 20, the add unit 22 and the divide unit 24, the normalizing unit 28 and the rounding unit 30, respectively. The control circuit 19 enables the respective one of the multiply unit 20, the add unit 22 and the divide unit 24, the normalizing unit 28 and the round unit 30 to input one or both of the operands provided at its input and perform its arithmetic operation. In accordance with the teachings of the present invention, however, the control signals further include means to permit the operands to pass or flow through the add unit 22, the renormalizing unit 28 and the round unit 30, without the unit's arithmetic function being performed upon the input operand.

While the floating point processing unit 13 is configured to perform addition, subtraction, multiplication, division and square root operations upon the input operands, it is the multiplication and division operations which are of particular interest herein. As previously set forth, multiplication and division operations utilizing floating point numbers require that the floating point numbers be normalized. Accordingly, if the predetector circuit 14 determines that either operand A or the operand B is denormalized, the controller circuit 19 shall control the normalization of the denormalized operands before permitting them to be input to the multiply unit 20 or the divide unit 26. It is contemplated, therefore, that the denormalizing unit 24 and the renormalizing unit 28 associated with the add unit 22 be utilized for the normalization of the input operands to the multiply and divide units 20, 26 and for the denormalization of the results output by the multiply and divide units 20, 26, furthermore, as new operands are constantly being input to the floating point processor unit 13, the controller circuit 19 minimizes the amount of processing time to normalize operands and denormalize results by scheduling operations according to priority. For example, if an input operand for an add operation and an input operand for a multiply operation require normalization, the controller circuit 19 will, by appropriate generation of enabling via the enable control bus, first select the input operand for the add operation for normalization. In such a manner, significant degradation of the ability of the floating point processing unit 13 to perform addition and subtraction operations is prevented.

More specifically, in the event that the predetector circuit 14 determines that one of the two operands A and B desired to be input to either the multiply unit 20 or the divide unit 26 is denormalized, the control circuit 19 stalls the normalized operand at the input of the multiply unit 20 or the divide unit 26 preventing the input of the normalized operand into the multiply unit 20 or the divide unit 26. The denormalized operand is then directed to the add unit 22 for normalization. As is typical with numerous add units of conventional design, the output of the add unit 22 is tied to the input of the normalizing unit 28. In a typical addition or subtraction operation, the normalizing unit 28 would be used to normalize the denormalized sum or difference produced by the add unit 22. Here, the normalizing unit 28 normalizes the input operand which is intended to be used in a multiply or divide operation. Accordingly, the input operand propagates through the add unit 22 without any arithmetic operation being performed thereon and is then normalized by the normalizing unit 28. The time needed to normalize a single denormalized operand is N cycles, where N is the latency of the add unit 22, renormalizer 28 and rounder 30. During the normalizing or "wrapping" of the input operand, the entire pipeline is put on hold so that the emulation of precise interrupts, for example those interrupts generated by the controller circuit 19 based upon the calculations performed by the predetector circuit 14 may be maintained.

Having been normalized by the renormalizing unit 28, the normalized input operand is then output by the normalizing unit 28 and continues on to the input of the round unit 30. At this point, an additional one cycle stall of the pipeline is necessary to move the normalized input, as well as any other information to either the A bus or the B bus. During the one cycle stall, the controller circuit 19 instructs the round unit 30 to propagate the normalized input operand therethrough without further manipulation. Once the normalized input operands are at the output of the round unit 30, the wrapping of the input operands is complete. The normalized input operand is then sent to the input of either the multiply unit 20 or the divide unit 26, either along the A bus if the originally denormalized input operand was the operand A or along the B bus if the originally denormalized input operand was the operand B, and the pipeline is restarted. In addition, an indication that the wrapping has been done to the input operands is provided to the multiply unit 20 or the divide unit 26 by the WRAP A and WRAP B lines, respectively. Once normalized operands A and B are provided at the inputs of either the multiply unit 20 or the divide unit 26, the controller circuit 19 generates an enabling signal to the multiply unit 20 or the divide unit 26 to permit the operands to be input to the selected arithmetic unit and the arithmetic function be performed thereon.

If both the input operand A and the input operand B are denormalized, the method of normalizing input operands before performing either multiply or divide operations must be modified slightly. When both input operands require denormalization, the multiply unit 20 or the divide unit 26 must be stalled for an additional period sufficient to permit the normalization of the second denormalized input operand. As the time required to normalize one operand was N cycles, the time needed to normalize two operands is N+1 cycles. To normalize two denormalized operands, the controller circuit 19 will sequentially direct the denormalized input operand A followed by the denormalized input operand B through the add unit 22 and the normalizing unit 24 to sequentially normalize each input operand. The controller circuit 19 will then direct the propagation of the normalized input operands through the round unit 30. In this case, however, the additional one cycle wait which stalls the pipeline is delayed until both normalized input operands have been propagated through the round unit without any operations being conducted thereon. After the one cycle stall, the serial wrapping of two input operands is complete and the pipeline is restarted. The normalized operands A and B are then provided to the inputs of either the multiply unit 20 or the divide unit 26 and the controller circuit 19 will then enable the selected arithmetic unit to perform the selected arithmetic operation using the normalized input operands A and B.

The normalized input operands A and B are also provided via the A and B buses to the predetector circuit 14. Once the input operands have been normalized, the predetector circuit 14 may then examine the input operands, for example by performing partial arithmetic operations using the input operands, for possible floating point exceptions such as underflow or overflow conditions which would be produced by the selected arithmetic operations. To determine whether potential underflow or overflow conditions would be produced by the result of the multiply or divide operations, the predetector circuit 14 takes the sum and difference of the exponents of the normalized input operands A and B and then, based on the sum and difference of the exponents, determines whether the product or quotient of the input operands may potentially result in either an underflow condition or an overflow condition. If a potential exception such as a potential underflow condition or a potential overflow condition is detected by the predetector circuit 16, the controller circuit 19 shall, through the generation of a series of precise interrupts, serialize the numbers propagating through the pipe by permitting only one number to pass at a time.

Returning to the multiply unit 20 and the divide unit 26, the product or quotient produced by the multiplication or division of operands A and B will often produce a product or quotient having more digits than provided for in the floating point number format. Furthermore, as the width data path of the floating point processor unit 13 is 69 bits, the larger number will be easily accommodated. In such cases, the product or quotient must be rounded to the number of digits provided in the floating point number format. Accordingly, the output of the multiply unit 20 and the output of the divide unit 26 are respectively directed to the round unit 30 for rounding. Furthermore, as the sum or difference produced by adding or subtracting a pair of input operands will often also produce a result having more digits than provided in the floating point format, the output of the add unit 22 is directed through the round unit 30 for rounding as well.

If the rounded result does not have a potentially negative or zero representation of the exponent, as determined by the predetector 14, the result A is output to the register 40 for storage. If the rounded result has a potentially zero or negative representation of the exponent, the product is transmitted along the A or B bus to an input of the add unit 24 for denormalization. Denormalization is needed because when the result produced by an arithmetic operation has a zero or negative exponent, the result will likely have too many bits to fit into the register 40. There, the controller circuit permits the propagation of the normalized result through the add unit 22 where the denormalizing unit 24 denormalizes the result. The process of denormalizing normalized results, also referred to as "unwrapping", unlike input wrapping, does not typically require any holds on the pipeline since the predetector circuit 14 has already detected any floating point exceptions and held the pipe. Once the result is denormalized by the denormalizer 24, subsequent input operands may be input to the add unit 22 for the performing additional add and/or subtract operations. At this point, the denormalized output from the add unit 22 is rounded by the rounding unit 30 and output along the RESULT bus. Alternately, the normalized output may be propagated along the RESULT bus and either the A bus or B bus if the output is also needed for a next operation.

Having described the propagation of a pair of input operands through the floating point processor 13 where a simple arithmetic operation was performed on the input operands by the arithmetic operation units 20, 22, 24, 26, 28 and 30 in detail, the pipelining or "staging" of a plurality of input operands through the arithmetic operations units 20, 22, 26, 28 and 30, as well as the performance of compound arithmetic operations by the arithmetic operation units 20, 22, 24, 26, 28 and 30 shall now be described in connection with Table 1 set forth below.

| Operation | DS | MT | PS | DN | AD | RN | RU |
|---|---|---|---|---|---|---|---|
| conv. int to sp | | | | 1 | 2 | 3 | 4 |
| conv. int to dp | | | | 1 | 2 | 3 | 4 |
| conv. fp to int | | | | 1 | 2 | (3) | 3(4) |
| add dp | | | | 1 | 2 | (3) | (4) |
| divide dp | 1-17 | | | | | | 18 |
| compare dp | | | | 1 | 2 | | 3 |
| mult-acc dp | | 1-4 | 5 | 6 | 7 | 8 | 9 |
| mult-sum dp | | 1-4 | 5 | 6 | 7 | 8 | 9 |
| mult dp | | 1-4 | 5 | | | | 6 |
| subt dp | | | | 1 | 2 | (3) | 3(4) |
| add sp | | | | 1 | 2 | (3) | 3(4) |
| divide sp | 1-10 | | | | | | 11 |
| compare sp | | | | 1 | 2 | | 3 |
| mult-acc sp | | 1 | 2 | 3 | 4 | 5 | 6 |
| mult-sum sp | | 1 | 2 | 3 | 4 | 5 | 6 |
| mult sp | | 1 | 2 | | | | 3 |
| subt sp | | | | 1 | 2 | (3) | 3(4) |
| mult int | | 1 | 2 | | | | |
| move from accr | | | | 1 | 2 | | 3 |
| move to accr | | | | 1 | 2 | (3) | 3(4) |

TABLE 1 where:
DS = iterative divider 26-1;
MT = 32 by 32 multiplier 20-1;
PS = partial product summer 20-3;
DN = denormalizing unit 24;
AD = adder unit 25;

TABLE 1-continued

| | |
|---|---|
| RN = | renormalizing unit 28; |
| RU = | rounder unit 30; |
| accr = | accumulator 32, 34, 36, 38; |
| int = | integer number; |
| sp = | single precision fp number; |
| dp = | double precision fp number; |
| fp = | floating point number; |
| ( ) = | optional sequencing when renormalization required |
| conv = | perform conversion operation; |
| add = | perform addition operation; |
| divide = | perform division operation; |
| compare = | perform compare operation; |
| mult = | perform multiplication operation; |
| mult-acc = | perform multiplication operation and accumulate; |
| mult-sum = | perform multiplication operation and sum; |
| subt = | perform subtraction operation; |

As previously set forth, each arithmetic operation unit, i.e. the iterative divider 26-1, the 32 by 32 multiplier 20-1, the partial product summer 20-3, the denormalizing unit 24, the adder unit 25 and the renormalizing unit 28 has an intermediate result latch 26-2, 20-2, 20-4, 24-1, 25-1 and 29, respectively, associated therewith to latch the intermediate result produced by the corresponding arithmetic operation unit. Once the intermediate result is latched, a next input operand or intermediate result latched in the intermediate latch preceding the arithmetic operation unit is provided to the arithmetic operation unit. While the rounding unit 30 does not have an intermediate result latch associated therewith, the output of the rounding unit 30 may be output to the accumulators 32, 34, 36, and 38 for storage. Once the output of the rounding unit 30 is transmitted to the register 40 via the RESULT bus, returned to the arithmetic operation units via the A or B bus or stored in the accumulators 32, 34, 36, 38, a next intermediate result is input to the rounding unit 30. The time delay between pipelined inputs to one of the arithmetic operation units 20-3, 25, 28 and 30 from the output of the intermediate latch 20-2, 24-1, 25-1 and either 20-4, 26-2, 25-1 or 29, respectively, varies based on the latency time required to propagate operands or intermediate results through the appropriate arithmetic operation unit. For example, since the iterative divider 26-1 is configured to process four bits of the input operands during each pass through the iterative divider 26-1, seventeen cycles are required to produce the result of a division operation using a pair of double precision input operands while only ten cycles are required to produce the result of a division operation using a pair of single precision input operands. Similarly, four cycles are required to multiply a pair of double precision input operands while single precision input operands may be multiplied together in a single cycle by the 32×32 multiplier 20-1. As further indicated in Table 1, additional cycles are required to process operands requiring normalization of the operands.

Returning now to the multiply-accumulate compound arithmetic operation previously identified in Equation (1), the sum C-1 produced by summing a series of products of input operands A and B would be stored in the accumulators 32, 34, 36, 38. Upon the input of a next set of single precision operands A and B to the floating point processor 13 and the selection of the multiply operation, the 32 by 32 multiplier 20-1 would multiply operands A and B during cycle 1 to produce a series of sums and carries. The sums and carries are then input to the partial product summer 20-3 and the result produced during cycle 2. The sum C-1 stored in the accumulators 32, 34, 36, 38 and the product A * B at the output of the partial product summer 20-3 are propagated to the inputs of the add unit 22 via the ACC and MULTIPLY-RESULT buses, respectively. During cycle 3, either the product of operands A and B or C-1 is denormalized by the denormalizing unit 24 and, during cycle 4, C-1 and (A * B) are added by the adder 25 to produce C-2. The result C-2 is then propagated to the renormalizer 28 where the result C-2 is normalized during cycle 5. The result C-2 is then rounded by the rounding unit 30 during cycle 6 and propagated to the accumulators 32, 34, 36, 38 for storage.

Discussing next the multiply-sum compound arithmetic operation identified by Equation (2), the accumulated sum C-1 is again stored in the accumulators 32, 34, 36, 38 preceding the commencement of this operation. As previously set forth, operand A and operand B are input to the floating point processor 13 via the A and B buses, respectively. Operand B propagates to the input ope and latch 15-1 where it is latched and held. Operand A, on the other hand, propagates to the first input of the multiply unit 20. The accumulated sum C-1 propagates to the second input of the multiplier 20 via the ACC bus and the multiplexer 16. During cycle 1, the accumulated sum C-1 and operand A are propagated into the 32 by 32 multiplier 20-1 where a series of sums and carries are produced and the series of sums and carries propagate into the partial product summer 20-3 during cycle 2 to produce the result (A * C-1). The result (A * C-1) is then propagated to the input of the and unit 22 via the MULTIPLY-RESULT bus and the multiplexer 17. While the result (A * C-1) is being produced and propagated to the add unit 22, the operand B is delayed by the input operand latches 15-1 and 15-2. The controller circuit may then permit the propagation of the operand B to the add unit 22 by transmitting an enable signal along the latch control bus. During cycle 3 and 4, the result (A * C-1) and the operand B are propagated through the denormalizing unit 24 and the adder unit 25 for performing the arithmetic operation, hereby producing C-2. The result C-2 is then propagated to the renormalizer 28 where the result C-2 is normalized during cycle 5. The result C-2 is then rounded by the rounding unit 30 during cycle 6 and propagated to the accumulators 32, 34, 36, 38 for storage.

As can be seen from the above description of the present invention, there is provided a floating point processor which minimizes the amount of circuitry necessary to perform multiple arithmetic operation units. Circuitry is minimized by providing a common round unit for multiple arithmetic operation units, by the utilization of renormalizing circuitry associated with the add unit for normalizing multiplication operands and by the propagation of results through the renormalizer only when necessary. In addition, the floating point processing unit is configured to perform a series of arithmetic operations at a high issue rate by efficiently pipelining intermediate results. A series of latches are used to latch intermediate results of the outputs of the arithmetic operation units as well as the outputs of components of the arithmetic operation units. In such a manner, the input of a next pair of operands into the arithmetic operation unit or into a component thereof is permitted upon latching of the prior output. Finally, the floating point processor provides for the pipelining of compound arithmetic operations by latching certain input operands while accumulating results to be used in a compound arithmetic operation with the latched input operands.

However, those skilled in the art will recognize that many modifications and variations besides those specifically mentioned may be made in the techniques described herein without departing substantially form the concept of the present invention. Accordingly, it should be clearly understood that the form of the invention described herein is exemplary only and is not intended as a limitation on the scope of the invention.

What is claimed is:

1. A pipelining floating point processor comprising:
   first and second arithmetic operation units;
   means for providing input operands to said first and second arithmetic operation units;
   at least one accumulator for storing the results of arithmetic operations performed by said first arithmetic operation unit;
   means for providing the results stored in said at least one accumulator as accumulated input operands to said second arithmetic operation unit;
   first staging means for sequencing said input operands and said accumulated input operands to said second arithmetic unit; and
   second staging means for latching intermediate results of arithmetic operations performed by said first arithmetic operation unit using said input operands and intermediate results produced by said second arithmetic operation unit using said input operands and said accumulated operands;
   wherein said first and second staging means and said accumulator provide for the pipelining of compound arithmetic operations performed by said floating point processor using said input and accumulated operands through said floating point processor.

2. A floating point processor as set forth in claim 1 wherein said first arithmetic operation unit is a floating point multiply unit having first and second inputs and an output.

3. A floating point processor as set forth in claim 2 wherein said second staging means further comprises a first latch connected to said output of said foating point multiply unit.

4. A floating point processor as set forth in claim 3 wherein said floating point multiply unit further comprises:
   a 32 by 32 multiplier having first and second inputs and an output; and
   a partial product summer having an input connected to said 32 by 32 multiplier and an output.

5. A floating point processor as set forth in claim 4 wherein said first latch is connected to said output of said partial product summer and wherein said second staging means further comprises a second latch connected to the output of said 32 by 32 multiplier.

6. A floating point processor as set forth in claim 3 wherein said second arithmetic operation unit is a floating point adder unit having first and second inputs and an output.

7. A floating point processor as set forth in claim 6 wherein said second staging means further comprises a second latch connected to said output of said floating point adder unit.

8. A pipelining floating point processor comprising:
   a floating point multiply unit having first and second inputs and an output;

a floating point add unit having input means and an output;

means for providing input operands to said multiply and add units;

at least one accumulator for storing the results of arithmetic operations performed by said multiply and add units;

means for providing the results stored in said at least one accumulator as accumulated operands to said multiply and add units;

staging means for sequencing said input operands, results produced by said multiply and add unit using said input operands, and results produced by said mulitply and add units using said input operands and said accumulated operands, said staging means further comprising:

means for temporarily delaying input operands to be provided to said multiply and add units for compound arithmetic operations while producing accumulated operands to be provided to said multiply and add units with said delayed input operands for compound arithmetic operations;

a first latch connected to said output of said multiply unit, said first latch latching intermediate results produced by said multiply unit; and a second latch connected to said output of said floating point add unit, said second latch latching intermediate results produced by said add unit;

said staging means providing for the pipelining of arithmetic operations, including compound arithmetic operations performed using said accumulated operands, through said floating point processor; and a denormalizer for denormalizing normalized numbers, said denormalizer having first and second inputs and input means;

wherein the input means of said add unit is connected to said output means of said denormalizer.

9. A floating point processor as set forth in claim 8 wherein said intermediate results latch means further a third latch having an input connector to said denormalizer output means and an output connected to said adder circuit input means.

10. A pipelining floating point processor comprising:

a floating point multiply unit having first and second inputs and an output;

a floating point add unit having first and second inputs and an output;

means for providing input operands to said multiply and add units;

at least one accumulator for storing the results of arithmetic operations performed by said multiply and add units;

means for providing the results stored in said at least one accumulator as accumulated operands to said multiply and add units;

staging means for sequencing said input operands, results produced by said multiply and add units using said input operands, and results produced by said multiply and add units using said input operands and said accumulated operands, said staging means further comprising:

means for temporarily delaying input operands to be provide to said multiply and add units for compound arithmetic operations while producing accumulated operands to be provided to said multiply and add units with said delayed input operands for compound arithmetic operations;

a first latch connected to said output of said multiply unit, said first latch latching intermediate results produced by said multiply unit; and a second latch connected to said output of said add unit, said second latch latching intermediate results produced by said add unit;

wherein said staging means provides for the pipelining of arithmetic operations, including compound arithmetic operations performed using said accumulated operands, through said floating point processor; and a renormalizer for normalizing denormalized numbers, said renormalizer having an input connected to the output of said add unit and an ouput, wherein denormalized intermediate results produced by said add unit are input into said renormalizer for normalization.

11. A floating point processor as set forth in claim 10 wherein said intermediate results latch means further comprises a third latch having an input connected to the output of said renormalizer and an output.

12. A floating point processor as set forth in claim 11 further comprising a rounder unit for rounding the results produced by said adder, multiplier, or renormalizer, said rounder unit having an input connected to the outputs of said adder, multiplier and renormalizer and an output.

13. A floating point processor as set forth in claim 12 wherein each of said at least one accumulator further comprises an input connected to the output of said rounder unit and an output.

14. A floating point processor as set forth in claim 12 wherein said means for providing input operands to said at least one arithmetic operation unit further comprises:

a first input operand bus for providing a first series of first input operands to said floating point processor; and a second input operand bus for providing a second series of second input operands to said floating point processor.

15. A floating point processor as set forth in claim 14 wherein said first input operand bus is connected to the first input of said multiplier and said second input of said multiplier further comprises first multiplexer means having inputs connected to said second input operand bus and said output of said accumulators and a single output for selectively providing one of said first multiplexer inputs to said multiplier.

16. A floating point processor as set forth in claim 15 wherein said means for temporarily delaying input operands to said second arithmetic operation unit further comprises at least one latch having an input connected to said second input operand bus and an output connected to said adder unit.

17. A floating point processor as set forth in claim 15 wherein said first input of said adder further comprises second multiplexer means having inputs connected to said first input operand bus and said multiplier output and a single output for selectively providing one of said second multiplexer inputs to said adder and said second input of said adder further comprises third multiplexer means having inputs connected to said output of said means for temporarily delaying input operands, said second input operand bus and said accumulator outputs.

18. A floating point processor as set forth in claim 17 further comprising a divider unit having a first input connected to said first input operand bus, a second input connected to said second input operand bus and an output connected to said rounder unit input.

19. A floating point processor as set forth in claim 18 wherein said intermediate results latch means further comprises a fourth latch having an input connectd to said divider unit and an output connected to said rounder unit.

20. A floating point processor as set forth in claim 19 further comprising an output result bus connected to said rounder unit output.

21. A floating point processor as set forth in claim 20 further comprising a controller circuit for providing latch and unlatch signals to said first, second, third and fourth intermediate result latches and said input operand latch.

22. A floating point processor comprising:
  a first arithmetic operation unit having a pair of inputs for receiving input operands and an output for transmitting a result of said first arithmetic operation;
  a second arithmetic operation unit having a pair of inputs for receiving input operands and an output for transmitting a result of said second arithmetic operation, said second arithmetic operation unit including a denormalizer for denormalizing normalized input operands;
  a renormalizer for normalizing denormalized results produced by said second arithmetic unit;
  a rounder unit having an input connected to said first arithmetic operation unit output, said second arithmetic operation unit output and said renormalizer output;
  at least one accumulator for storing the results of arithmetic operations performed by said first and second arithmetic operation unit, each of said at least one accumulators having an input and an output;
  means for providing said accumulator output to said first and second arithmetic operation units; and
  means for for pipelining input operands and results through said floating point processor.

23. A floating point processor as set forth in claim 22 wherein said means for pipelining input operands and results through said floating point processor further comprises:
  a first latch for latching said first arithmetic operation unit output;
  a second latch for latching for latching said second arithmetic operation unit output; and
  a third latch for latching said renormalizer output.

24. A floating point processor as set forth in claim 23 wherein said means for pipelining input operands and results through said floating point processor further comprises a fourth latch for latching an output of said denormalizer.

25. A floating point processor as set forth in claim 24 wherein said means for pipelining input operands and results through said floating point processor further comprises a fifth latch for latching a first one of said pair of input operands to be provided to said second arithmetic operation unit when a second one of said pair of input operands is provided by said accumulator.

26. A floating point processor as set forth in claim 25 wherein said means for pipelining input operands and results through said floating point processor further comprises a control circuit for providing latch and unlatch signals to said first, second, third, fourth and fifth latches.

27. A floating point processor as set forth in claim 26 further comprising a third arithmetic operation unit having a pair of inputs for receiving input operands and an output for transmitting a result of said third arithmetic operation.

28. A floating point processor as set forth in claim 27 wherein the output of said third arithmetic operation unit is connected to the input of said rounder unit.

29. A floating point processor as set forth in claim 28 further comprising means for providing said rounder unit output to said first, second and third arithmetic operation units.

30. A floating point processor as set forth in claim 29 wherein said first arithmetic operation unit is a multiplier unit, said second arithmetic operation unit is an adder unit and said third arithmetic operation unit is a divider unit.

31. A pipelining floating point processor comprising:
  at least one arithmetic operation unit, said at least one arithmetic operator unit including an adder having input and output means;
  means for providing input operands to said at least one arithmetic operation unit;
  at least one accumulator or storing the results of arithmetic operations performed by said at least one arithmetic operation unit;
  means for providing the results stored in said at least one accumulator as accumulated operands to said at least one arithmetic operation unit;
  a denormalizer for denormalizing normalized numbers, said denormalizer having input and output means, said input means of said add unit being connected to said output means of said denormalizer;
  staging means for sequencing said input operands, results produced by said at least one arithmetic operation unit using said input operands, and results produced by said at least one arithmetic operation unit using said input operands and said accumulated operands;
  wherein said staging means provides for the pipelining of arithmetic operations, including compound arithmetic operations performed using said accumulated operands, through said floating point processor.

32. A floating point processor as set forth in claim 31 wherein said staging means further comprises a first latch connected to said output of said denormalizer, said first latch latching intermediate results produced by said denormalizer.

33. A pipelining floating processor comprising:
  at least one arithmetic operation unit;
  means for providing input operands to said at least one arithmetic operation unit;
  at least one accumulator for storing the results of arithmetic operations performed by said at least one arithmetic operation unit;
  means for providing the results stored in said at least one accumulator as accumulated operands to said at least one arithmetic operation unit;
  a renormalizer for normalizing denormalized numbers, said renormalizer having an input connected to the output of said at least one arithmetic operation unit and an output, wherein denormalized intermediate results produced by said at least one arithmetic operation unit are input into said renormalizer for normalization;

staging means for sequencing said input operands, results produced by said at least one arithmetic operation unit using said input operands, and results produced by said at least one arithmetic operation unit using said input operands and said accumulated operands;

wherein said staging means provides for the pipelining of arithmetic operations, including compound arithmetic operations perfomed using said accumulated operands, through said floating point processor.

34. A floating point processor as set forth in claim 33 wherein said staging means further comprises a first latch connected to said ouput of said renormalizer, said first latch latching intermediate results produced by said renormalizer.

* * * * *